(12) United States Patent
Costa-Requena

(10) Patent No.: US 11,588,722 B2
(45) Date of Patent: Feb. 21, 2023

(54) SYSTEM AND METHOD FOR ISOCHRONOUS DATA TRANSMISSION IN INDUSTRIAL NETWORK

(71) Applicant: Cumucore Oy, Espoo (FI)

(72) Inventor: Jose Costa-Requena, Helsinki (FI)

(73) Assignee: Cumucore Oy, Espoo (FI)

( * ) Notice: Subject to any disclaimer, the term of this patent is extended or adjusted under 35 U.S.C. 154(b) by 208 days.

(21) Appl. No.: 16/952,746

(22) Filed: Nov. 19, 2020

(65) Prior Publication Data

US 2021/0243106 A1 Aug. 5, 2021

(30) Foreign Application Priority Data

Jan. 31, 2020 (FI) ..................................... 20205100

(51) Int. Cl.
*H04W 56/00* (2009.01)
*H04L 45/02* (2022.01)
*H04W 24/02* (2009.01)

(52) U.S. Cl.
CPC ............. *H04L 45/02* (2013.01); *H04W 24/02* (2013.01); *H04W 56/001* (2013.01)

(58) Field of Classification Search
None
See application file for complete search history.

(56) References Cited

U.S. PATENT DOCUMENTS

| 2017/0195110 A1 | 7/2017 | Ruffini et al. |
| 2017/0223712 A1 | 8/2017 | Stephens et al. |

(Continued)

FOREIGN PATENT DOCUMENTS

| CN | 109587784 | * | 5/2019 |
| WO | 2019243669 A1 | | 12/2019 |

(Continued)

OTHER PUBLICATIONS

Brown et al, "Private 5G Mobile Networks for Industrial IoT" Heavy Reading, White Paper, retrieved from URL <https://www.qualcomm.com/media/documents/files/private-5g-networks-for-industrial-iot.pdf>, Sep. 21, 2020, 17 Pages.

(Continued)

*Primary Examiner* — Jenkey Van
(74) *Attorney, Agent, or Firm* — Ziegler IP Law Group, LLC

(57) ABSTRACT

A method for isochronous data transmission in industrial network. The industrial network includes first sub-network including first industrial devices and first base station, second sub-network including second industrial devices and first routing means, first wireless device configured to provide a communication between the first industrial devices and the first base station, a network controller coupled to the first base station and to the first routing means, and a reference clock. The method including providing first timing information to the first sub-network and second timing information to the second sub-network, configuring the first wireless device to transfer data from the first industrial devices to the network controller based on the first timing information, receiving the data from the first sub-network and transferring the received data from the network controller to the second industrial devices of the second sub-network via routing means using the second timing information.

12 Claims, 6 Drawing Sheets

(56) References Cited

U.S. PATENT DOCUMENTS

| | | | |
|---|---|---|---|
| 2019/0190635 A1 | 6/2019 | Goel et al. | |
| 2019/0364492 A1 | 11/2019 | Azizi et al. | |
| 2020/0259896 A1* | 8/2020 | Sachs | G07C 9/00174 |
| 2022/0128977 A1* | 4/2022 | Kumar | H04L 69/18 |

FOREIGN PATENT DOCUMENTS

| | | | | |
|---|---|---|---|---|
| WO | WO-2020144258 A2 * | 7/2020 | | |
| WO | WO-2020151806 A1 * | 7/2020 | | H04W 56/0015 |

OTHER PUBLICATIONS

Finnish Patent and Registration Office, Search Report, Application No. 20205100, dated Sep. 22, 2020, 2 pages.
Wikipedia, Time-Sensitive Networking, retrieved from URL <https://en.wikipedia.org/index.php?title=Time-Sensitive_Networking&oldid=935577091>, Jan. 13, 2020, 12 Pages.
European Patent Office, Extended European Search Report, Application No. 21152252.9, dated Jun. 28, 2021, 10 pages.

* cited by examiner

SYSTEM AND METHOD FOR ISOCHRONOUS DATA TRANSMISSION IN INDUSTRIAL NETWORK

TECHNICAL FIELD

The present disclosure relates generally to telecommunications and networking; and more specifically, to systems and methods for isochronous communication in an industrial network.

BACKGROUND

Notably, an industrial network deals with transmission of large volumes of data, across multitude of devices (namely, industrial devices) connected in an industrial environment. In this regard, the industrial network is required to enable connection between the industrial devices that are spread across large spatial areas of the industrial environment and further enable isochronous communication therebetween. Additionally, the industrial network is required to cater real-time (namely, time-sensitive or isochronous) needs of transmission of data across the multitude of industrial devices in the industrial environment. Moreover, the industrial environment demands reliable connectivity amongst the industrial devices that may be distributed in both cellular and fixed infrastructure of communication network.

However, presently deployed network infrastructure in the industrial network fail to enable time-sensitive data transmission for industrial internet applications in an isochronous manner. Additionally, in instances of congestion, there is a limit to a number of industrial devices that may be attached to communication network owing to limited availability of communication links or channels for transmission of data. In such case, conventional systems fail to fulfil transmission requests from each of the industrial devices in the industrial network, thereby causing operational delays in the industrial network.

Moreover, the cellular infrastructure is, typically, implemented using a single communication technology (for example, 3G, 4G, 5G, Wi-Fi, and the like). Additionally, the cellular infrastructure is incompetent in creating network slices across different communication technologies to be used for data transmission with duplicated data. Moreover, industrial devices attach to the cellular infrastructure are allotted available communication links randomly based on time of attachment to the cellular infrastructure. Therefore, such cellular infrastructure is unreliable in data transmission amongst the industrial devices owing to no pre-assigned schedule or pre-allocated communication link for each of the industrial devices. Subsequently, the industrial devices receive downlink data as unicast deliver based on communication links assigned randomly by base station. Therefore, for downlink communication the cellular infrastructure does not enable unstructured data to be broadcasted to all devices simultaneously similar to Ethernet broadcast. Moreover, due to limited number of communication links and channels provided by the communication technology, base station reaches a limit in number of industrial devices attached to the cellular infrastructure that can be assigned a network resource. In such case, connection request to base station form the industrial devices may be rejected if the base station runs out of available communication links to be used.

Furthermore, presently deployed industrial networks are incapable of integrating wired infrastructure, specifically, industrial device operating within wired infrastructure with wireless infrastructure, specifically, industrial device operating within the cellular infrastructure, in order to execute two-way reliable data transmission to promote time-sensitive data transmission from remote locations. Therefore, current industrial networks face crucial challenges owing to increasing deployment of the industrial devices operating within cellular infrastructure for remote operation within the industrial environment owing to lack of means for isochronous data transmission in the industrial network amongst the industrial devices operating within cellular infrastructure and industrial devices operating within fixed infrastructure.

Additionally, the industrial network lacks a mean that can be connected to the industrial devices in the industrial network in order to receive data transmission requests having different priorities. Subsequently, conventional industrial network fails to reliably administer data with different priorities based on needs associated thereto, for example, encapsulation, duplication, resource allocation, and slicing. Furthermore, industrial network does not provide environment for unstructured data transmission by industrial devices operating within the cellular infrastructure. Additionally, presently deployed industrial networks fail to provide an environment that enables uplink prescheduled unicast transmission of data integrated with downlink broadcast transmission that is equivalent to Industrial Ethernet-based Protocols (for example, EtherCAT, PROFINET, PROFIBUS, Common Industrial Protocol, HART, POWERLINK, Modbus-TCP, and Ethernet/IP), for industrial devices operating within the cellular infrastructure.

Therefore, in light of the foregoing discussion, there exists a need to overcome the aforementioned drawbacks associated with the conventional industrial networks for data transmission between plurality of industrial devices.

SUMMARY

The present disclosure seeks to provide a method for an isochronous data transmission in an industrial network. The present disclosure also seeks to provide a system for an isochronous data transmission in an industrial network. The present disclosure seeks to provide a solution to the existing problem of asynchronous data transmission in industrial network; that fails to integrate uplink unidirectional transport with broadcast downlink transport at pre-scheduled time slots. An aim of the present disclosure is to provide a solution that overcomes at least partially the problems encountered in prior art, and provides a system and method for isochronous data transmission in the industrial network based on pre-scheduled time slots.

In one aspect, an embodiment of the present disclosure provides a method for an isochronous data transmission in an industrial network wherein the industrial network comprises:
 a first sub-network comprising at least one first industrial device and a first base station,
 a second sub-network comprising at least one second industrial device and a first routing means,
 a first wireless device configured to provide a communication between the at least one first industrial device and the first base station,
 a network controller coupled to the first base station and to the first routing means, and
 a reference clock,
 the method comprising steps of:
 providing a first timing information to the first sub-network;
 providing a second timing information to the second sub-network;

configuring the first wireless device to transfer a data from the at least one first industrial device to the network controller based on the first timing information;

receiving, by the network controller, the data from the first sub-network; and transferring the received data from the network controller to the at least one second industrial device of the second sub-network via the first routing means using the second timing information.

In another aspect, an embodiment of the present disclosure provides a system for an isochronous data transmission in an industrial network, wherein the industrial network comprises:

a first sub-network comprising at least one first industrial device and a first base station, a second sub-network comprising at least one second industrial device and a first routing means, a first wireless device configured to provide a communication between the first industrial device and the first base station, a network controller coupled to the first base station and to the first routing means, and a reference clock, wherein the network controller is configured to:

provide a first timing information to the first sub-network;

provide a second timing information to the second sub-network;

configure the first wireless device to send a data from the at least one first industrial device to the network controller based on the first timing information;

to receive the data from the first sub-network; and send the received data from the network controller to the at least one second industrial device of the second sub-network via the first routing means using the second timing information.

Embodiments of the present disclosure substantially eliminate or at least partially address the aforementioned problems in the prior art, and enables data transmission mechanism that allows all the industrial devices connected through cellular or fixed networks to receive ultra-reliable, low latency structured and unstructured data sent uplink and downlink by each cellular or fixed industrial device.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
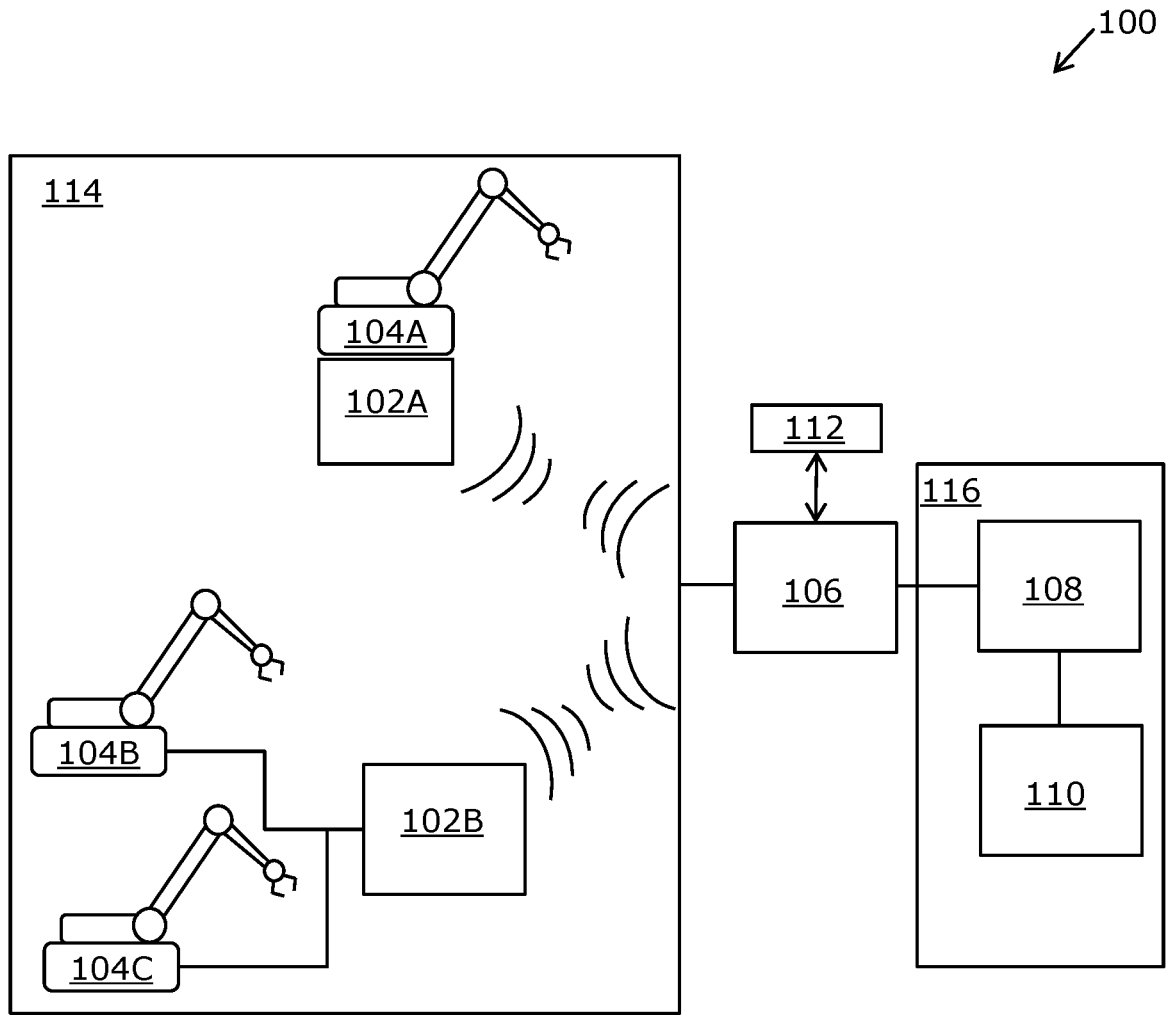
FIG. 1 is a schematic illustration of a system for an isochronous data transmission in an industrial network, in accordance with an exemplary embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for an isochronous data transmission in an industrial network wherein the industrial network comprises:

a first sub-network comprising at least one first industrial device and a first base station, a second sub-network comprising at least one second industrial device and a first routing means, a first wireless device configured to provide a communication between the at least one first industrial device and the first base station, a network controller coupled to the first base station and to the first routing means, and a reference clock, the method comprising steps of:

providing a first timing information to the first sub-network;

providing a second timing information to the second sub-network;

configuring the first wireless device to transfer a data from the at least one first industrial device to the network controller based on the first timing information;

receiving, by the network controller, the data from the first sub-network; and transferring the received data from the network controller to the at least one second industrial device of the second sub-network via the first routing means using the second timing information.

In another aspect, an embodiment of the present disclosure provides a system for an isochronous data transmission in an industrial network, wherein the industrial network comprises:

a first sub-network comprising at least one first industrial device and a first base station, a second sub-network comprising at least one second industrial device and a first routing means, a first wireless device configured to provide a communication between the first industrial device and the first base station, a network controller coupled to the first base station and to the first routing means, and a reference clock, wherein the network controller is configured to:

provide a first timing information to the first sub-network;

provide a second timing information to the second sub-network;

configure the first wireless device to send a data from the at least one first industrial device to the network controller based on the first timing information;

receive the data from the first sub-network; and send the received data from the network controller to the at least one second industrial device of the second sub-network via the first routing means using the second timing information.

The present disclosure provides a method and a system for an isochronous data transmission in an industrial network. The method and the system disclosed herein aims to achieve an industrial internet protocol that enables time-sensitive data transmission and networking in the industrial network. The method and system described herein enables time-sensitive data transmission between the at least one first industrial device connected for synchronous communication and the at least one second industrial device connected for asynchronous communication. Notably, the first wireless device, the network controller and the routing means are installed in the industrial network. Beneficially, the network controller generates timing information for the industrial devices, wherein the industrial devices operate to provide uplink data and receive downlink data based on timing information associated therewith. Furthermore, the timing information ensures allocation of time slots to each of the industrial devices thereby preventing an event of denial of service to an industrial device during congestion or collision while transmission of data. Moreover, the method and system disclosed herein integrates pre-scheduled unicast uplink transmission from the industrial devices with broadcast downlink transmission to the industrial devices, wherein the industrial devices are connected using cellular, wireless and fixed network infrastructure. Additionally, such transmission is equivalent to fixed isochronous data transmission.

Beneficially, the method and the system operate to aggregate multiple communication links or channels (using, for example, 3G, 4G, 5G, Wi-Fi, Ethernet) to enable reliable isochronous data transmission in the industrial network. Moreover, the present disclosure is of advantage in transmission of structured as well as non-structured data without overhead computation and high latency.

The system and the method described herein overcomes drawbacks associated with presently utilized Process Field Net (PROFINET) systems deployed for transmission of data over Industrial Ethernet, in the industrial network. Moreover, the system and the method also overcome limitations associated with deployment of conventional cellular networks as the industrial network. The said system and method can be deployed in industrial networks, for example, power distribution plants, smart grids, power generation plants, manufacturing facilities, warehouses, fabrication facilities, and so forth.

Notably, cellular network allows transmission of the data over a distance without employing wires, cables, or any other form of electrical conductors. In other words, the cellular network allows for transmission of data without any physical connection between two points (such as two industrial devices). The wireless communication using the cellular network is facilitated by, for example, a spectrum of electromagnetic waves (namely, radio waves). Moreover, such cellular network employs at least one base transceiver (for example, the first base station; as discussed in detail later, herein). Optionally, frequency of radio wave for transmission of data is in range of 3 kilohertz (kHz) to 300 gigahertz (GHz). More optionally, frequency of radio wave for transmission of data is in range of 30 kilohertz (kHz) to 100 kilohertz (kHz).

The present disclosure provides a method and a system for isochronous data transmission in the industrial network. It will be appreciated that isochronous data transmission refers to transmission of asynchronous data (namely, asymmetric data) from a data source (namely, an industrial device) over a synchronous transmission system (namely, the industrial network). In such case, each data source is given a fixed time to transmit data (specifically, packets of data). Typically, a data source, of a data to be transmitted, sends the data at whatever time interval suitable therefor. Subsequently, the data is received by a transmitting means (for example, the first base station and/or the network controller) for a fixed time associated with the data source. Optionally, the isochronous data transmission does not implement error-checking mechanism. Moreover, optionally, time of receival of data from each of data source has strict adherence to fixed time allocated to each of the data source.

Moreover, industrial network refers to a communication infrastructure for an industry. Herein, the industrial network refers to individual networks, or a collection thereof interconnected with each other and functioning as a single large network. Optionally, such industrial network is implemented by way of wired communication network, wireless (or cellular) communication network, or a combination thereof. It will be appreciated that physical connection is established for implementing the wired communication network, whereas the wireless communication network is to implemented using electromagnetic wave. Examples of such industrial network include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX), and different generation of Wireless access (WiFi a, b, an, ac, ax) networks.

The industry may be, for example, a power distribution plant, a power generation plants, a smart-grid, a manufacturing facility, a ware-house, a fabrication facility, a factory, and so forth. It will be appreciated that an industry comprises a plurality of industrial devices. Herein, the plurality of industrial devices are communicatively coupled to each other, via the industrial network.

Notably, industrial device refers to electronic device, mechanical device, electro-mechanical device, and the like, associated with (or used in) the industrial network. The industrial device is capable of performing specific tasks associated with the aforementioned system and method such as transmitting data and/or receiving data. Furthermore, the industrial device is intended to be broadly interpreted to include any electronic device that may be used for voice and/or data communication over the wired communication network, or the wireless communication network. Examples of the industrial device includes, but is not limited to, cellular phone, personal digital assistant (PDA), handheld device, wireless modem, laptop computer, personal computer, electrical motor, electrical actuator, controller, transmission equipment, transceiver station, router, robot, sensor, IoT based device, and networking devices. Beneficially, the industrial device is connected to the industrial network in order to enable time-sensitive transmission of data.

Additionally, optionally, the industrial device includes a casing, a functioning unit, a memory, a processor, a network interface card, a microphone, a speaker, a keypad, a display, a transmitter, and a receiver. Moreover, the industrial device is to be construed broadly, so as to encompass a variety of different types of devices (for example, electrical, mechanical, electronic, and so forth) that operate to perform a function. Optionally, a function performed by an industrial device is governed or facilitated by way of data provided by the industrial network, in the industry. In this regard, in an instance, an industrial device in an industry operates based on instructions received as data from another device, via the industrial network.

The industrial network comprises the first sub-network comprising at least one first industrial device and the first base station. Specifically, the first sub-network establishes a communication infrastructure for transmission of data from the at least one first industrial device to the first base station in a pre-scheduled manner. Notably, the at least one first industrial device includes time synchronization and scheduling capabilities, wherein the time synchronization and scheduling capabilities enable the at least one first industrial device to send data in processed manner in accordance with a time slot associated therewith. In accordance with an embodiment of the present disclosure, the first sub-network establishes synchronous communication within the industrial network. Additionally, the at least one first industrial device refers to industrial device capable of synchronous transmission of data over communication links, for example, cellular network.

Moreover, the first base station refers to a fixed point of communication for the wireless communication in the industrial network, such as the cellular network. It will be appreciated that there may be multiple base stations for establishing wireless communication means in the industrial network. Optionally, the first base station provides information to and from, one or more transmitting/receiving units. Pursuant to embodiments of the present disclosure, the first base station relays data to and from the at least one first industrial device, the first wireless device and/or the network controller. The first base station is configured to allocate control radio channels (CCH) and data radio channels (DCCH) for unicast uplink transmission of data from the at least one first industrial device, the first wireless device and/or the network controller. Additionally, the first base station is configured to allocate different radio control channels (MCCH) and traffic radio channels (MTCH) for downlink receiving of data for the at least one first industrial device, the first wireless device and/or the network controller.

Optionally, a plurality of base stations are configured together to establish wireless communication means in the industrial network. The plurality of base stations are managed by the network controller (as discussed in detail later, herein). Optionally, the first sub-network enables the communication infrastructure for synchronous data transmission therein.

It will be appreciated that the wireless communication (specifically, cellular network) refers to a radio communication network, wherein the cellular network is distributed over land through cells. Specifically, each cell includes a fixed location transceiver, for example, the first base station. It will be appreciated that the wireless communication allows for asymmetric transmission between the at least one first industrial device, the first wireless device and the network controller; and further transport of data facilitated by the cellular network consist of Internet Protocol (IP) based data. Pursuant to embodiments of the present disclosure, the cellular network employs Low Power Wide Area Network radio interfaces such as a Narrowband Internet of Things (NB-IoT), and Long-Term Evolution-Machine Type Communication (LTE-M) so as to enable device to device communication over the cellular network by facilitating transport of non-IP data.

The industrial network comprises the second sub-network comprising at least one second industrial device and the first routing means. Specifically, the second sub-network establishes a communication infrastructure for transmission of data from the at least one second industrial device in an unscheduled manner. Notably, the at least one second industrial device does not include a distinctive time synchronization and time scheduler. Therefore, the at least second industrial device sends raw data uplink independent of assigned time slots associated thereto. Optionally, the at least one second industrial device is configured to perform asynchronous data transmission in the second sub-network. Additionally, the at least one second industrial device are asynchronous industrial device capable of transmitting data over communication links, for example, Ethernet, in a non-scheduled manner.

The at least one second industrial device and the first routing means are connected to each other using, for example, cellular network, cables, optic fibres, and so forth. In an example, connection between the at least one second industrial device and the first routing means form a Local Area Network (LAN) in the industrial network. More optionally, the LAN is a Software Defined-LAN (SD-LAN). More optionally, PROFINET cables may be used for such wired communication between the at least one second industrial device and the first routing means, thereby providing advantages of ethernet cable communication, in the industrial network.

Moreover, the routing means (or the first routing means) refers to a device configured to forward data (specifically, packets of the data) from the at least one second industrial device. It will be appreciated that the routing means implement a routing protocol in order to reliably forward data packets to a destination address associated therewith. Examples of routing protocol includes, but are not limited to, Routing Information Protocol (RIP), Interior Gateway Protocol (IGRP), Open Shortest Path First (OSPF), Exterior Gateway Protocol (EGP), Enhanced Interior Gateway Routing Protocol (EIGRP), Border Gateway Protocol (BGP), and Intermediate System-to-Intermediate System (IS-IS). Optionally, the routing means employs TCP/IP protocols.

Pursuant to embodiments of the present disclosure, the routing means in the second sub-network is configured to set routing policies for the at least one second industrial device in the second sub-network. It will be appreciated that the at least one second industrial device is incapable of scheduled transmission of data. Therefore, the routing policies set by the routing means are employed to establish network slices between the at least one second industrial device and the first wireless device (as discussed in detail later, herein), thereby enabling communication between the at least one second industrial device and the at least one first industrial device. It will be appreciated that the routing means is capable of connecting to a plurality of second industrial devices in order to provide time sensitive networking ability to the at least one second industrial device.

Optionally, the routing means is communicatively coupled to at least one of the: first wireless device, network controller, first base station, at least one first industrial device, at least one second industrial device. Pursuant to embodiments of the present disclosure, the routing means is communicatively coupled to the at least one second industrial device via a wired communication channel or a wireless communication channel to effectively establish routing policies therefor. Moreover, the routing means is communicatively coupled to the first wireless device via, for example, a wired communication channel to enable time scheduled networking of the at least one second industrial device. In an instance, the routing means operate to forward data packets received from a second industrial device from the at least one second industrial device to the first base station, via the first wireless device. In another instance, the routing means operate to forward data received from the first base station, via the first wireless device to the second industrial device from the at least one second industrial device.

More optionally, the second sub-network comprises a server. Notably, the server refers to a structure and/or module that include programmable and/or non-programmable components configured to store, process and/or share information. Optionally, the server includes any arrangement of physical or virtual computational entities capable of enhancing information to perform various computational tasks. Moreover, the server receives unstructured data (or data frames) from a sender device, for example, the at least one second industrial network, the first wireless device, the network controller, and the at least one first industrial device. Additionally, the server encapsulates and decapsulates the unstructured data between the plurality of communication links (for example, fixed network link, cellular network link, wireless network link, and the like) to be received by each of the devices (such as, the at least one second industrial network, the first wireless device, the network controller, and the at least one first industrial device) in the industrial network, simultaneously.

Additionally, optionally, the routing means is configured to connect the second sub-network with the server and the first base station for transmission of data from the at least one second industrial device to the at least one first industrial device. The routing means operates based on network slices that are set by the network controller using network management module (for example, SDN technology). The routing means supports packet duplication of data to be transmitted from the first wireless device and/or the network controller. Moreover, the routing means is configured to de-duplicate data from multiple communication links to send a single data message to the at least one second industrial device.

In an instance, the routing means is configured to synchronize transmission and reception scheduling system of an industrial device, such as, the at least one second industrial device, that is connected through, for example, a fixed network infrastructure to a cellular network core, to send and receive data to industrial devices, such as, the at least one second industrial device, connected to, for example, the cellular network infrastructure. The routing means synchronizes the scheduling system with the same as the industrial devices connected to the cellular network infrastructure to enable isochronous data transmission in the industrial network.

Moreover, the term "timing information" as used herein refers to data or a set of data representing a particular arrangement or a sequence of time, for each of industrial devices in the industrial network. Specifically, the particular arrangement or the sequence of time describes a time slot for each of the industrial devices. More specifically, a given industrial device operates to transmit data in accordance with a given time slot corresponding to the given industrial device, as specified in the timing information. In an example, the timing information is represented by way of a list comprising a time slot corresponding to a unique identification relating to each of the industrial devices in the industrial network. Specifically, the timing information allows for timestamping of the industrial devices, thereby synchronizing them. Beneficially, the timing information is generated by the network controller (as discussed in detail later, herein) so as to avoid collisions in a process of transmission of data by the industrial devices, thereby minimizing delays and optimizing operations in the industrial environment. Optionally, the timing information is stored as data in a file or a folder.

The timing information is converted into the plurality of timing packets to be received by each of the industrial devices in the industrial network. Specifically, the network controller breaks down long timing information into smaller packets (namely, the plurality of timing Packets). It will be appreciated that each of the plurality of timing packets traverse between source (namely, the network controller) and receiver (namely, each of the industrial devices). The plurality of timing packets are provided as a broadcast for downlink to each of the industrial devices in the industrial network.

Optionally, the first timing information associated with the at least one first industrial device and the second timing information associated with the at least one second industrial device comprises at least one of: an uplink time slot, a downlink time slot, for each of the at least one first industrial device and the at least one second industrial device, respectively. Pursuant to embodiments of the present disclosure, the term 'uplink time slot' refers to a time slot when an industrial device transmits or uploads data for communication. Moreover, the term 'downlink time slot' refers to a time slot when the industrial device operates to receive or listen a previously uploaded data. In an instance, an industrial device in the industrial network operate to receive data in accordance with the downlink time slot corresponding to the device, as specified in the timing information. Alternatively, in another instance, the industrial device operates to receive all downlink data communicated by, for example the first base station.

Pursuant to embodiments of the present disclosure, the industrial network comprises at least one first industrial device that employs communication network in order to transmit data in a scheduled manner and the at least one second industrial device that employs communication network in order to transmit data in a scheduled manner. Moreover, industrial devices in the industrial network comprising the at least one first industrial device and the at least one second industrial device, are configured to transmit data therebetween, by employing at least one of the: network cables (for example, Ethernet cables), the routing means, the first wireless device, the base station, the network controller.

The method comprises providing the first timing information to the first sub-network. The method comprises providing the second timing information to the second sub-network. Notably, the network controller (as discussed in detail later, herein) is configured to generate the timing information. Specifically, the timing information constitutes the first timing information for the first sub-network and the second timing information for the second sub-network. More specifically, the first timing information comprises time slots for each of the at least one first industrial device for communication of data therethrough and the second timing information comprises time slots for each of the at least one second industrial device for communication of data therethrough. Moreover, the network controller broadcasts the timing information, via the first base station and/or the routing means to provide the timing information to each of the at least one first industrial device, the routing means and the first wireless device. Optionally, the network controller provides the first timing information to the at least one first industrial device and the first wireless device as a broadcast downlink, via the first base station; and further provides the second timing information to the routing means, via the first base station or a wired channel.

Furthermore, the industrial network comprises the reference clock. Notably, the network controller is configured to generate the timing information by employing the reference clock. Specifically, the reference clock enables the network controller to realize precise time slots to be utilized for generation of the timing information. Optionally, the time reference clock is enabled by way of Global Positioning System (GPS) receiver, Global Navigation Satellite System (GNSS) receiver, or Atomic clock. Furthermore, optionally, the network controller receives a reference for the timing information from the reference clock. In such case, the network controller encapsulates the reference for the timing information provided by the reference clock to generate the timing information. Moreover, optionally, the network controller encrypts the timing information before broadcast thereof.

Optionally, providing the first timing information and the second timing information comprises synchronizing an internal clock of the first wireless device, an internal clock of the at least one first industrial device and an internal clock of the at least one second industrial device with the reference clock. Specifically, the internal clock of the first wireless device, internal clock of the at least one first industrial device is synchronized based on the first timing information and the internal clock of the at least one second industrial device and further an internal clock of the routing means are synchronized based on the second timing information. Notably, synchronizing internal clock of a device (such as, the at least one first industrial device, the first wireless device, the at least one second industrial device, the routing means) with the reference clock enables the device to communicate with the first base station precisely within a time slot allotted thereto thereby preventing any overlap in communication of data.

The method comprises configuring the first wireless device to transfer the data from the at least one first industrial device to the network controller based on the first timing information. It will be appreciated that the data is transferred as a plurality of data packets or data frames. Moreover, the data transmitted by the at least one first industrial device is received by the first wireless device via the first base station in the first sub-network. Moreover, the first wireless device is configured to provide the data to the network controller, using the first base station. In this regard, the first wireless device and the network controller are communicatively coupled by way of wireless network infrastructure comprising for example, cellular network, radio access terminals, wireless networks (for example, Wi-Fi), and the like. Moreover, the data is provided to the network controller based on the first timing information, wherein the first timing information specifies the uplink and downlink time slot for the at least one first industrial device. In an embodiment, a first industrial device from the at least one first industrial device may send the data to be transmitted to a second industrial device from the at least one second industrial device at any instance of time to the first wireless device, via the first base station. In such case, the first wireless device schedules the data based on uplink time slot associated with the first industrial device specified in the first timing information. In another embodiment, the first industrial device sends the data to be transmitted to the second industrial device to the first wireless device, at the uplink time slot associated with the first industrial device specified in the first timing information. In such case, the first wireless device simultaneously routes the data to the network controller for subsequent operation thereof.

The industrial network comprises the first wireless device configured to provide the communication between the at least one first industrial device and the first base station. Notably, the first wireless device refers to a hardware device that connects the at least one first industrial device to the first base station in order to establish a communication network. In this regard, the first wireless device may provide the communication between the at least one first industrial device and the base station using at least one of: phone lines, cables (for example, optic cables, fibre cables), cellular networks (for example, 3G, 4G, 5G, and the like), Wi-Fi. Subsequently, the wireless device is fabricated to include cellular modem, wired modem and wireless modem. Optionally, the first wireless device is operable to perform modulation and demodulation of sent data and received data, respectively.

It will be appreciated that the first wireless device may be a part of a single device or a proxy where many other devices can be connected that utilize the first wireless device as aggregator of synchronous transmission of data. Moreover, at least one first industrial device connected to the first wireless device via a wireless or a wired link are synchronous industrial devices. Moreover, the first wireless device aggregates data from the at least one first industrial device in order to utilize the system described in the present disclosure to transport data to second sub-network that comprises asynchronous industrial devices (namely, the at least one second industrial device). The first wireless device utilizes plurality of communication links to transmit data to the second sub-network where the at least one second industrial device connected using wireless or wired links with the routing means behave as end-to-end wired connection and the at least one second industrial device are unaware of communication links utilized by the first wireless device.

In an instance, a first wireless device connected to at least one first industrial device comprises cellular and wireless modems, and further modules for handling functionality associated with wireless communication infrastructure. In another instance, a first wireless device connected to at least one first industrial device comprises fixed sockets in addition to cellular and wireless modems, wherein the at least one first industrial device is connected to the first wireless device via the fixed sockets. Herein, the at least one first industrial device is connected to the first wireless device through cables; and further the first wireless device is connected to the first base station through a cellular network (for example, 3G, 4G, 5G), a wireless network (for example, Wi-Fi), or a combination thereof. Beneficially, the first wireless device makes the at least one first industrial device capable of time-sensitive networking.

Optionally, the first wireless device comprises at least one first Radio Access Network, a time synchronization and scheduling module to receive the first timing information from the network controller, a fail over and data multiplexing module to multiple the data over at least one communication link within plurality of communication links, a resource slicing module to allocate the network and radio resources to create network slices, a wireless device manager module to request the communication links within the plurality of communication links from the network controller, a network management module to manage the network resources, a resource allocation module to analyse the resources, and at least one of: a cellular modem, a wireless modem and at least one socket. Notably, the modules comprised in the first wireless device are operable to convert the at least one first industrial device into a Time Sensitive Networking (TSN) device based on synchronization, scheduled and reliable communication. Such communication is established using double or triple connections based on, for example, two or more of 4G, 5G, Wi-Fi, and wired connection. Moreover, the first wireless device in the industrial network enables ultra-reliable transport of data with the plurality of communication links with a failover system to ensure robust communication of data (notably, IP data and non-IP data) between the first sub-network and the first base station, thereby further with the second sub-network.

In this regard, optionally, at least one first Radio Access Network (RAN) establishes communication link between the first wireless device and the network controller of the industrial network, via the first base station. Specifically, at least one first RAN comprises base stations (such as the first base station). The at least one first RAN corresponds to base stations for, for example, cellular network infrastructure (such as, 3G, 4G, 5G), wireless network infrastructure (such as, Wi-Fi access points), and fixed network infrastructure (such as, Ethernet cables).

Moreover, optionally, the time synchronization and scheduling module is operable to receive the first timing information from the network controller, wherein the broadcasted first timing information corresponds to the at least one first industrial device and is further employed by the first wireless device to schedule data uplink and downlink from the at least one first industrial device to the first base station. The time synchronization and scheduling module that allows the first wireless device to synchronize internal clock thereof with internal clock of the at least one second industrial device to agree with time slots based on the second timing information to enable isochronous transport between the at least one first industrial device connected to the first wireless device and the at least one second industrial device.

Additionally, optionally, the fail over and data multiplexing module is operable to duplicate the data provided as an uplink by a first industrial device over at least one communication link within the plurality of communication links to ensure reliability. The fail over and data multiplexing module that duplicate each of incoming data packets and further distribute the duplicated data packets across different activated communication links within plurality of communication links to guarantee reliability.

Optionally, the resource slicing module is operable to allocate the network and radio resources to create network slices for transmission of data. The resource slicing module is operable to allocate different network and communication resources to create network slices, wherein different data traffic (data from different source) are assigned different network slices based on priority index and/or requirement thereof in terms of, for example, bandwidth, delay, and packet loss. Specifically, the resource slicing module separates traffic (uplink data) and further isolates traffic having higher priority index from other less critical traffic. Moreover, optionally, the resource slicing module in the first wireless device interacts with a resource slicing module in the network controller to deploy end-to-end network slices between the first wireless device and a second industrial device, to which the data is transmitted.

Optionally, the wireless device manager module is operable to request the communication links within the plurality of communication links from the network controller in order to create network slices for transmission of the data. The wireless device manager receives a request from the first wireless device to allocate new communication link or communication link with existing communication link in order to modulate capacity of the communication link thereby ensuring reliability in the communication of data. The wireless device manager module interacts with the first base station to request additional communication links within communication links provided by the first base station in order to, for example, increase capacity and request different quality of service in terms of delay, bit rate, and so forth. The wireless device manager module ensures ultra-reliable transmission of data packets with low latency and based on requirements of the data packets from the first wireless device to the at least one second industrial device, via the first base station.

Optionally, the network management (for example, a Software Defined Network (SDN) management) module is operable to manage the network resources in the first wireless device for operations (for example, packet encapsulation, packet fragmentation, packet marking, change in packet formatting, and the like) to create different slices for different data traffic collected in the first wireless device, wherein the different data traffic are received from different first industrial devices from the at least one first industrial device. Additionally, the network management module (specifically, the Software Defined Network (SDN) controller) manages network interfaces in the first wireless device and manages packets in the first wireless device to assign different priority index and/or change packet formatting of data packets to be transmitted in order to increase reliability and reduce latency in the data transmission. In other words, the SDN controller in the first wireless device assigns different priority index to traffic (namely, uplink data from different sources) and classify the traffic to be transmitted over multiple communication links.

Optionally, the resource allocation module is operable to analyse the resources available with the first wireless device and further use thereof. Additionally, optionally, the at least one socket is employed to establish a communication link between a first industrial device and the first wireless device, via a wired means (for example, a cable).

Additionally, optionally, the cellular modem, and/or the wireless modem are operable to establish a communication link between the first wireless device and the at least one first industrial device and/or the first wireless device and the first base station, wherein the cellular modem employs a broadband cellular network technology (for example, 2G, 3G, 4G, 5G and the like) and the wireless modem employs a wireless networking technology (for example, Wi-Fi).

More optionally, the first wireless device is managed by the aforesaid modules thereof. Specifically, the modules of the first wireless device manage data transmission between the at least one second industrial device and the first wireless device, the first wireless device and the at least one first industrial device, and further the first wireless device and the first base station in the industrial network. The first wireless device connects the at least one first industrial device and the at least one second industrial device by providing reliable communication links in the industrial network.

Optionally, the first wireless device is configured to:
receive from the network controller the first timing information, the time slots and schedule the received time slots for the first industrial device;
multiplex the received data; and
activate a plurality of communication links to establish communication interface for the at least one first industrial device and the at least one second industrial device, for isochronous data transmission in the industrial network.

In this regard, the first wireless device receives the first timing information from the network controller, wherein the network controller broadcasts the first timing information. optionally, the first wireless device utilizes common transport layer for receiving the broadcasted first timing information. It will be appreciated that the common transport layer enables receiving of structured and unstructured data with low latency for fixed network interface in the first wireless device. Moreover, optionally, the first wireless device and the at least one first industrial device receives the first timing information to be used by the at least one industrial device to synchronize internal clocks thereof for synchronous transmission and reception of data. Moreover, upon receiving data from the at least one first industrial device, the first wireless device multiplexes traffic, wherein uplink data from the at least one first industrial device forms the traffic. Subsequently, the first wireless device, specifically, the plurality of modules of the first wireless device activates the plurality of communication links to establish communication interface for the at least one first industrial device and the at least one second industrial device, for isochronous data transmission in the industrial network.

Optionally, configuring the first wireless device comprises:
activating a plurality of communication links to establish communication interface for the at least one first industrial device and the at least one second industrial device, using the first wireless device, for isochronous data transmission in the industrial network;
slicing activated communication links from the plurality of communication links, based on an aggregated capacity for isochronous data transmission in the industrial network, to create the network slices; and
designating sliced communication links for transmission of the data based on a priority index associated with the data.

In this regard, the first wireless device with fixed, cellular and wireless interface comprises a plurality of modules (for example, the aforementioned modules) to activate the plurality of communication links, such as, multiple radio technologies simultaneously and multiple radio channels within each radio technology. Herein, the multiple radio technologies are established by cellular networks (for example, LTE, 3G, 4G, 5G, 6G) wireless network (for example, Wi-Fi) and fixed network (for example, Ethernet). Subsequently, the first wireless device activates the plurality of communication links (or multiple communication links) for uplink transport of structured and unstructured data (for example, IP data, non-IP data, Ethernet data, raw data). Specifically, the network management module (for example, the SDN module) is configured to activate the plurality of communication links to establish communication interface for the at least one first industrial device and the at least one second industrial device, for isochronous data transmission in the industrial network. Furthermore, the resource slicing module is operable to slice activated communication links from the plurality of communication links, based on an aggregated capacity for isochronous data transmission in the industrial network, to create the network slices. Specifically, the first wireless device aggregates, schedules and multiplexes data transmission over the activated communication links in order to create network slices for reliable data transmission. Moreover, the wireless device manager and the network management module ensures allotment of network resources (specifically, network slices) for transmission of the data based on the priority index of the data, wherein the priority index for the data is defined by a source industrial device sending the data.

In this regard, the first wireless device comprises a plurality of modules, wherein the plurality of modules operate to perform the aforementioned steps in order to configure the first wireless device. Notably, the first wireless device comprises fixed interfaces for fixed connections, and the cellular modem and the wireless modem to utilize radio channels for uplink and down link transmission of structured and unstructured data using optimized network bearer (i.e. 4G, 5G, 6G, Wi-Fi). Optionally, the fixed interfaces for fixed connections is utilized for common data transmission of structured and unstructured data with high reliability and low latency, for example, 1 milliseconds (ms). Additionally, optionally, the first wireless device and the at least one first industrial device are able to send the data at uplink time slot specified in the timing information in order to fully synchronize with other devices (for example, the routing means, the network controller, and the at least one second industrial device) to avoid collisions in the industrial network. Moreover, the first wireless device and the at least one first industrial device are able to send the data without scheduled uplink time slot if 'no real time' or 'no isochronous' mode is selected by a user of the industrial network.

It will be appreciated that the industrial network may have a plurality of first wireless device, that are communicatively coupled to the at least one first industrial device. In an example, the industrial network has two first wireless device. In such case, a first wireless device and a second wireless device have substantially similar functionality and configuration. Moreover, the first wireless device is connected to a first industrial device 'A' via a cellular network; additionally, the second wireless device is connected to first industrial devices 'B' and 'C' via a wired network. Subsequently, the first wireless device and the second wireless device establishes communication link between the first industrial devices 'A', 'B' and 'C' and the first base station. Additionally, optionally, the industrial network comprises a plurality base station. In such case, the first wireless device and the second wireless device is configured to establish the communication link between the first industrial devices 'A', 'B' and 'C' and available base stations from the plurality of base stations based on configuration (for example, cellular, wired, wireless, and the like) of the first industrial devices 'A', 'B' and 'C'.

The method comprises receiving, by the network controller, the data from the first sub-network. Specifically, the network controller receives the data from the first wireless device based on timing information. More specifically, the first wireless device sends the data to the network controller via the first base station based on timing information (notably, uplink time slot) associated with a first industrial device that is a sender of the data. Moreover, optionally, the first industrial device directly sends the data to the network controller via the first base station based on timing information associated therewith.

Notably, the industrial network comprises the network controller coupled to the first base station and to the first routing means. Specifically, the network controller refers to a structure and/or module that includes programmable and/or non-programmable components configured to store, process and/or share information. Optionally, the network controller includes any arrangement of physical or virtual computational entities capable of enhancing information to perform various computational tasks. Furthermore, it will be appreciated that the network controller may be both single hardware device and/or plurality of hardware device operating in a parallel or distributed architecture. In an example, the network controller may include components such as memory, a processor, a network adapter and the like, to store, process and/or share information with other computing components, such as the industrial devices, the first wireless device, the routing means. Optionally, the network controller is implemented as a computer program that provides various services (such as database service, processing service, and so forth) to other devices, modules or apparatus.

Notably, the network controller comprises network core functionality to enable uplink and downlink connection from the at least one first industrial device and the at least one second industrial device. Specifically, the network controller provides to high capacity communication facilities that connects primary nodes. The network controller provides paths (namely, communication link) for exchange of data between different sub-networks. In an instance, the network controller acquires data from a source device (for example, a first industrial device), over the wireless communication network, and further transfers the data to fixed communication network (for example, fixed Ethernet network) for communication of the data to a receiver device (for example, a second industrial device). Alternatively, optionally, the source device and the receiver device are the second industrial device and the first industrial device, respectively. Optionally, the network controller has a flat topology or a mesh topology. More optionally, the network controller employs circuit switching technology, packet-switching technology, or a combination thereof.

In an instance, the network controller provides a broadband cellular network technology, such as, an 4G Evolved Packet Core (EPC) or 5G Core (5GC). In such case, the network controller is composed of at least one of constituent elements: Home Subscriber Server (HSS), Unified Data Management (UDM), Serving gateway (SGW), Session Management Function (SMF), Packet Data Network Gateway (PDN GW), User Plane Function (UPF), Mobility Management Entity (MME) and Access Mobility management Function (AMF). The constituent elements enable the network controller to efficiently route data from a device (namely, a source device) to another device (namely, a receiver device). In another instance, the network controller provides a Service Capability Exposure function (SCEF) in 4G or SCS in 5G. The 4G SCEF will be integrated with Network Exposure Function (NEF) which becomes SCS that supports Cellular optimized IoT communications in 5G. It will be appreciated that the SCEF or SCS network controller implemented with the radio interfaces such as NB-IoT and LTE-M, allows for exchange of non-IP data using Ethernet frames between the plurality of devices. In yet another instance, the network controller provides a wireless networking technology (for example, Wi-Fi). Such wireless networking technology operates to host a wireless LAN. In yet another instance, the network controller provides a wired networking technology (for example, PROFINET, Ethernet cables, and so forth). Pursuant to embodiments of the present disclosure, the network controller provides two or more of the aforementioned networking technologies. It will be appreciated that the network controller may comprise repeaters or switches in order to eliminate any dead network zone or provide reliable communication means throughout the spatial area of the industrial network.

Optionally, the network controller comprises at least one second Radio Access Network, a time synchronization and scheduling controller to provide the first timing information to the first sub-network and second timing information to the second sub-network, a fail over and packet duplication controller to aggregate the multiplexed data and allocate communication links to the industrial network, a resource slicing controller to set a policy for creating network slices, a wireless device controller to receive a request from the wireless device to allocate communication links, a network management controller to communicate with routers and switches in the industrial network, a resource allocation controller to manage the network resources and to allocate the network slices. Notably, the modules comprised in the network controller are operable to convert the at least one second industrial device into a Time Sensitive Networking (TSN) device based on synchronization, scheduled and reliable communication. Such communication is established using double or triple connections based on, for example, two or more of 4G, 5G, Wi-Fi, and wired connection. Moreover, the network controller in the industrial network enables ultra-reliable transport of data with the plurality of communication links with a failover system to ensure robust communication of data (notably, IP data and non-IP data) between the first sub-network and the second sub-network.

In this regard, optionally, at least one second Radio Access Network (RAN) establishes communication link between the network controller and the first wireless device and the routing means. Specifically, at least one second RAN comprises communication links established by the network core of the network controller using the first base station. The at least one second RAN corresponds to base stations for, for example, cellular network infrastructure (such as, 3G, 4G, 5G), wireless network infrastructure (such as, Wi-Fi access points), and fixed network infrastructure (such as, Ethernet cables).

Moreover, optionally, the time synchronization and scheduling controller is operable to provide the first timing information to the first sub-network and second timing information to the second sub-network. Such timing information is provided as a downlink broadcast message to the first wireless device, the routing means, the at least one first industrial device and the at least one second industrial device. The time synchronization and scheduling module allows the network controller to synchronize internal clock thereof with the reference clock for generating the first timing information and the second timing information to enable isochronous transport between the at least one first industrial device and the at least one second industrial device.

Additionally, optionally, the fail over and packet duplication controller is operable to aggregate the multiplexed data and allocate communication links to the industrial network. Specifically, the fail over and packet duplication controller aggregates duplicated data packets received over the plurality of communication links or allocates new communication links in the second sub-network to the duplicated data packets over the second sub-network communication links till end device, wherein the end device is a second industrial device that receives the data in the second sub-network.

Optionally, the resource slicing controller is operable to set a policy for creating network slices. In this regard, the resource slicing controller sets policies for at least one of: the first wireless device, the routing means. Moreover, the resource slicing modules configures at least one of: the first wireless device, the routing means, to adequately allocate network slices to data for communication therefrom based on, for example, size, quality, priority index, bandwidth, delay, and packet loss.

Moreover, optionally, the wireless device controller is operable to receive a request from the first wireless device to allocate communication links. Specifically, the request from the first wireless device to allocate new communication links in existing communication links is to, for example, increase capacity or reliability of transmission of data and request different quality of service in terms of delay, bit rate, and so forth.

Additionally, optionally, the network management controller is operable to communicate with the routing means in the industrial network. Specifically, the network management controller (for example, an SDN controller) is operable to manage network resources allocated to various traffic from the first sub-network and the second sub-network. Moreover, the network management controller manages the network resources based on priority index and required characteristics associated thereto. Moreover, the network management controller assigns different priority index to traffic from the first wireless device or the first sub-network and further classifies multiple communication links for transmission of the traffic to the second sub-network. The SDN controller in the network controller sets routing policies in the routing means of the second sub-network to isolate and prioritize traffic that requires low latency or high reliability from other less critical traffic received from the first wireless device or a first industrial device from the at least one first industrial device. Moreover, the network management module of the first wireless device communicates with the network management controller of the network controller to manage network resources in the second sub-network to allocate network slices that will be used for transmission and isolation of traffic received from multiple communication links into the second sub-network.

Moreover, optionally, the resource allocation controller is operable to manage the network resources and to allocate the network slices for transmission of data therethrough.

Additionally, optionally, the network controller is connected to the first routing means in the second sub-network, wherein the first routing means are connected to the at least one second industrial device for booth unicast and broadcast communication using routing policies specified by the network controller. It will be appreciated that the second sub-network may comprise a plurality of routing means. In such case, the network controller is communicatively coupled to each of the plurality of routing means and is further operable to configure the plurality of routing means with associated routing policies and rules to assign network resources to each network slice and separate traffic in the second sub-network with different priority index.

Optionally, the network controller manages a plurality of base stations in the industrial network, wherein the network controller dynamically configures the plurality of base stations (for example, cellular base station, radio access base station, and so forth) to provide multiple communication links with different communication resources on each of the plurality of base stations. Such multiple communication links provides common communication resources for each of the at least one first industrial device to enable thereto to transmit the data (or data frames, or plurality of data packets) in the multiple communication links to the at least one second industrial device with necessary reliability and low latency.

More optionally, the network controller is connected to the plurality of base stations (for example, the first base station) or other network technologies (for example, radio access technologies) that are connected to the first wireless devices for uplink and downlink connection. Moreover, the plurality of base stations or other network technologies are a part of the common transport layer that are used simultaneously to send and receive duplicated data packets to the first wireless device. Subsequently, the network controller synchronizes the devices in the industrial network to ensure that all the devices receive the timing information accurately. Additionally, the time synchronizing and scheduling module of the first wireless device receives the timing information from the network controller for each of the at least one first industrial device to select uplink time slot therefor.

Additionally, the method comprises transferring the received data from the network controller to the at least one second industrial device of the second sub-network via the first routing means using the second timing information. In this regard, the network controller provides the data received from the first sub-network to the routing means, wherein the routing means is configured with routing policies. Subsequently, the routing means routes the data to be received by the at least one second industrial device based on the second timing information associated therewith. It will be appreciated that the routing means provide data to the at least one second industrial device based on downlink time slot associated therewith.

Optionally, transferring the received data comprises configuring the routing means to transfer the data form the network controller to the at least one second industrial device based on the second timing information. It will be appreciated that the at least one second industrial device lack the time scheduling capability; and are connected to the network controller via the routing means. Subsequently, the network controller configures the routing means with routing policies and rules to assign network resources to each network slice for transmission of data from the at least one second industrial device, and separate data traffic with different priority index. Moreover, the routing means aggregates the data received from the at least one second industrial device and further communicates different data in accordance with the second timing information and routing policies and rules, thereby providing the data from the at least one second industrial device in a scheduled manner to the first base station.

Optionally, the network controller configures the first base station for network resource in the first sub-network and also configures network resources in the second sub-network using SDN controller to create network slices and further interacts with the SDN module in the first wireless device to set up network slices for transmission of data from the first wireless device to the network controller or end-to-end network slice between the first wireless device and the at least one second industrial device.

Moreover, optionally, the network controller, receives duplicated the data from different communication links and further de-duplicates the data to be sent as a single data to the second sub-network. Alternatively, optionally, the network controller sends the duplicated data over the plurality of communication links in an encapsulated manner in different structure until the first routing means, wherein the first routing means operate to de-duplicate the duplicated data from the plurality of communication channels.

Additionally, the network controller delivers the timing information for the first wireless device in synchronization with the at least one first industrial device in order to enable isochronous data transmission from the first wireless device to the at least one second industrial device in the second sub-network.

Optionally, the method further comprises employing a machine learning algorithm to implement operations associated with at least one of the: network controller, first wireless device. Notably, the term "machine learning algorithms" refer to a category of algorithms employed by a device implementing a software application. The machine learning algorithms allows the device to become more accurate in predicting outcomes and/or performing tasks associated with the software application, without being explicitly programmed. Specifically, the machine learning algorithms are employed to artificially train the device so as to enable it to automatically learn, from analysing training dataset and improving performance or output from experience, without being explicitly programmed, to efficiently execute software applications.

Optionally, the machine learning algorithms are executed by a least one of the: network controller, the first wireless device. It will be appreciated that the device executing the machine learning algorithms are trained using a training dataset. More optionally, the machine learning algorithms are trained using training dataset comprising labelled data, unlabelled data, or a combination thereof. In this regard, the machine learning algorithms undergo at least one of: unsupervised training, supervised training, reinforced training, semi-supervised training. Furthermore, the machine learning algorithms are trained by interpreting patterns in the training dataset and adjusting the machine learning algorithms accordingly to get a desired output.

Optionally, the first wireless device comprises a machine learning module to monitor, analyse available network resources and optimize usage of the network resources to ensure ultra-reliable and low latency data transmission. Moreover, operation of the first wireless device to manipulate network resources and/or data packets to prioritize and change structure of the data packets to best utilize available network resources, and apply different network policies to the data packets is performed based on machine learning algorithms. Furthermore, the resource allocation module of the first wireless device comprises machine learning functionality to continuously analyse existing network resources in addition to incoming traffic, time synchronization offset, device computing, memory resources, status information of other modules of the first wireless device, and so forth to ensure quality of data transmission or sends warning or alert messages to a user of the industrial network (such as, a network operator) informing about malfunctioning in the device.

Moreover, optionally, the network controller comprises a machine learning module to monitor and collect data from different modules of the network controller to be processed to find optimal usage of network resources. The machine learning module of the network controller communicates with the machine learning module of the first wireless device to allow optimal allocation of network resources between the first wireless device and the at least one first industrial device, the first wireless device and the network controller, or the first wireless device and the routing means or the at least one second industrial device.

In an example embodiments of the present disclosure, the first wireless device is configured to activate multiple communication links (for example, radio interface over cellular network and wireless network, wired interface, or a combination thereof), wherein the data to be transmitted is duplicated over the multiple communication links and sent over the activated communication links from the plurality of communication links. Moreover, the first wireless device synchronizes an internal clock thereof, and of each of the at least one first industrial device with the reference clock with the first timing information, to a level on nanoseconds or lower. Additionally, the first wireless device is connected to a plurality of first industrial device via wired, wireless or cellular network infrastructure. Additionally, the routing means, configured by the network controller with the routing policies, synchronizes an internal clock thereof, and of each of the at least one second industrial device with the reference clock with the second timing information, to a level on nanoseconds or lower to support scheduled isochronous communication in the industrial network. Moreover, the first wireless device creates network slices based on an aggregated capacity for uplink data to be transferred from the first sub-network to ensure the traffic gets necessary network resources (for example, bandwidth, latency, quality, and the like) and further performs pre-emption of communication links to guarantee time sensitive communication within the industrial network. Moreover, the wireless device manager of the first wireless device communicates with the network controller to negotiate therewith to request for allocation of more network resources for transmission of certain data, for example, having higher priority index, having higher quality requirement, over new network bearer with higher Quality of Service (QoS) in terms of Guaranteed Bit Rate and bandwidth, and so forth. The traffic of uplink data from the at least one first industrial device is multiplexed and further duplicated to be transmitted over a plurality of activated communication links. Furthermore, the multiplexed traffic from the first wireless device is sent to the network controller based on the first timing information, via the first base station. The network controller further operates to de-duplicate the data received via the plurality of activated communication links and further provides the data as a single message to the routing means. The routing means, typically configured by the network controller, further allocates network resources for transmission of the received data to the at least one second industrial device. In this regard, optionally, the routing means transmits data for a second industrial device based on a downlink time associated with the second industrial tie, or broadcasts the data to be acquired by associated at least one second industrial device. It will be appreciated that in another instance, data from the at least one second industrial device is to be transmitted to the at least one first industrial device. In such case, the routing means aggregates uplink data from the at least one second industrial device to provide it to the network controller that further provides the data to the first wireless device to be broadcasted to the at least one first industrial device.

DETAILED DESCRIPTION OF THE DRAWINGS

As required, detailed embodiments of the present disclosure are disclosed herein; however, it is to be understood that the disclosed embodiments are merely exemplary of the disclosure which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Various other objects, advantages, and features of the disclosure will become more readily apparent to those skilled in the art from the following detailed description when read in conjunction with the accompanying drawings, in which like reference numerals designate like parts throughout the figures thereof.

Referring to FIG. 1, there is shown a schematic illustration of a system for an isochronous data transmission in an industrial network 100, in accordance with an exemplary embodiment of the present disclosure. As shown, the industrial network 100 comprises a first sub-network 114 comprising at least one first industrial device (depicted as first industrial devices 104A, 104B and 104C) and a first base station (not shown). The industrial network 100 comprises a second sub-network 116 comprising at least one second industrial device (depicted as a second industrial device 110) and a first routing means 108. Moreover, the industrial network 100 comprises wireless device (depicted as a first wireless device 102A and a second wireless device 102B) configured to provide a communication between the first industrial devices 104A, 104B, 104C and the first base station. As shown, the first industrial device 104A is connected to the first wireless device 102A via a wireless network infrastructure and the first industrial devices 104B and 104C are connected to the second wireless device 102B via a wired network infrastructure. Additionally, the industrial network 100 comprises a network controller 106 coupled to the first base station and to the first routing means 108, and a reference clock 112. The network controller 106 is configured to provide a first timing information to the first sub-network 114, and a second timing information to the second sub-network 116. Additionally, the network controller 106 is configured to configure the wireless devices 102A and 102B to send data from the first industrial devices 104A, 104B and 104C to the network controller 106 based on the first timing information. Additionally, the network controller 106 is configured to receive the data from the first sub-network 114 and send the received data from the network controller 106 to the second industrial device 110 of the second sub-network 116 via routing means 108 using the second timing information.

Figure 2:
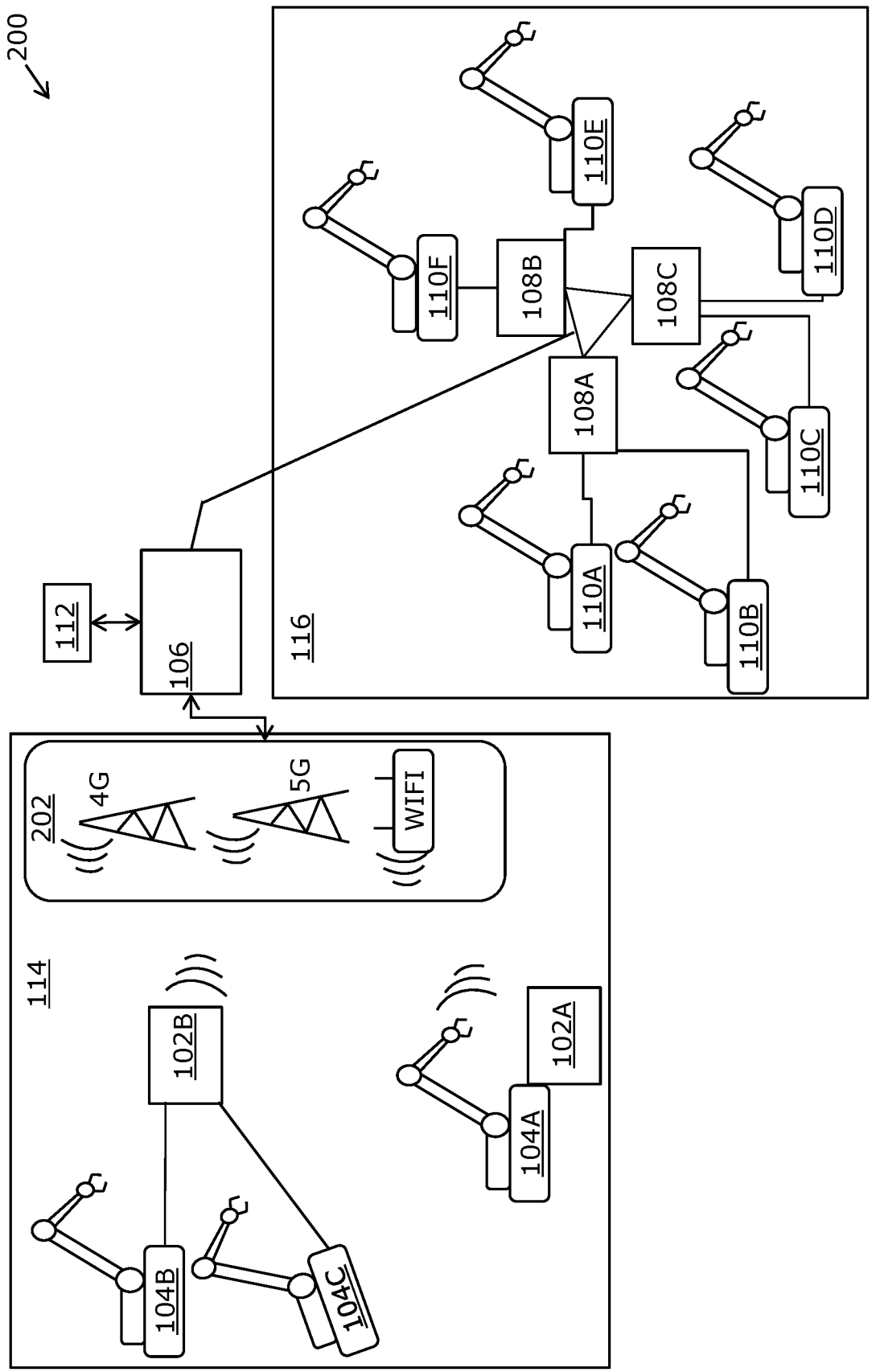
FIG. 2 is a schematic illustration of a system for an isochronous data transmission in an industrial network, in accordance with an exemplary embodiment of the present disclosure.

Referring to FIG. 2, there is shown a schematic illustration of a system for an isochronous data transmission in an industrial network 200, in accordance with an exemplary embodiment of the present disclosure. As shown, the industrial network 200 comprises a first sub-network 114 comprising at least one first industrial device (depicted as first industrial devices 104A, 104B and 104C) and a first base station 202. As shown, the first base station 202 comprises a plurality of base stations to establish multiple communication links over 4G, 5G and Wi-Fi, for transmission of data. The industrial network 200 comprises a second sub-network 116 comprising at least one second industrial device (depicted as second industrial devices 110A, 110B, 110C, 110D, 110E and 110F) and routing means (depicted as routing means 108A, 108B and 108C). Moreover, the industrial network 200 comprises wireless device (depicted as a first wireless device 102A and a second wireless device 102B) configured to provide a communication between the first industrial devices 104A, 104B, 104C and the first base station 202. As shown, the first industrial device 104A is connected to the first wireless device 102A via a wireless network infrastructure and the first industrial devices 104B and 104C are connected to the second wireless device 102B via a wired network infrastructure using at least one socket (not shown). Additionally, the industrial network 200 comprises a network controller 106 coupled to the first base station and to the routing means 108A, 108B and 108C, and a reference clock 112. The network controller 106 is configured to provide a first timing information to the first sub-network 114, and a second timing information to the second sub-network 116. The routing means 108A is connected to the second industrial devices 110A and 110B, the routing means 108B is connected to the second industrial devices 110C and 110D and the routing means 108C is connected to the second industrial devices 110E and 110F via a wired connection. Moreover, the routing means 108A, 108B and 108C form a local SDN-LAN for communication of data to and from the second industrial devices 110A, 110B, 110C, 110D, 110E and 110F in an isochronous manner based on the second timing information. Additionally, the network controller 106 is configured to configure the wireless devices 102A and 102B to send data from the first industrial devices 104A, 104B and 104C to the network controller 106 based on the first timing information. Additionally, the network controller 106 is configured to receive the data from the first sub-network 114 and send the received data from the network controller 106 to the second industrial devices 110A, 110B, 110C, 110D, 110E and 110F of the second sub-network 116 via the routing means 108A, 108B and 108C using the second timing information.

Figure 3A:
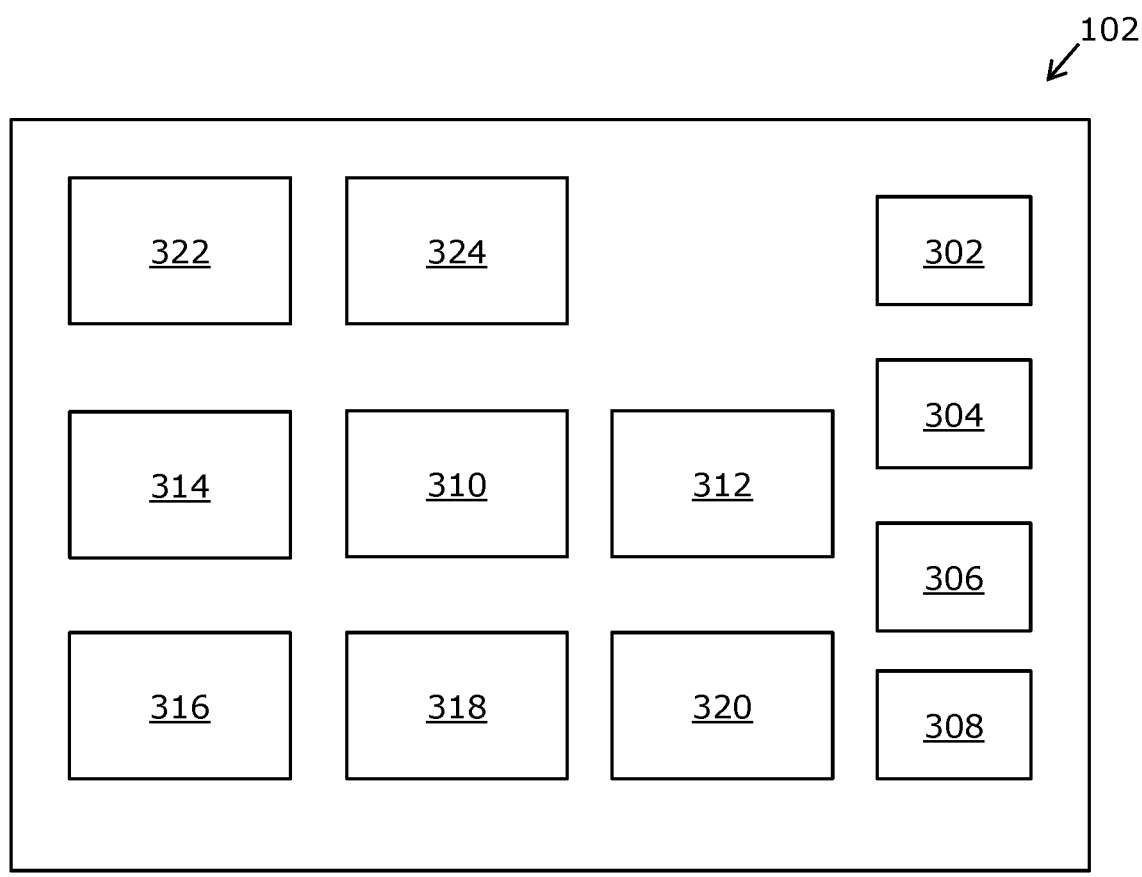
FIGS. 3A and 3B are schematic illustrations of first wireless device, in accordance with different embodiment of the present disclosure.
Figure 3B:
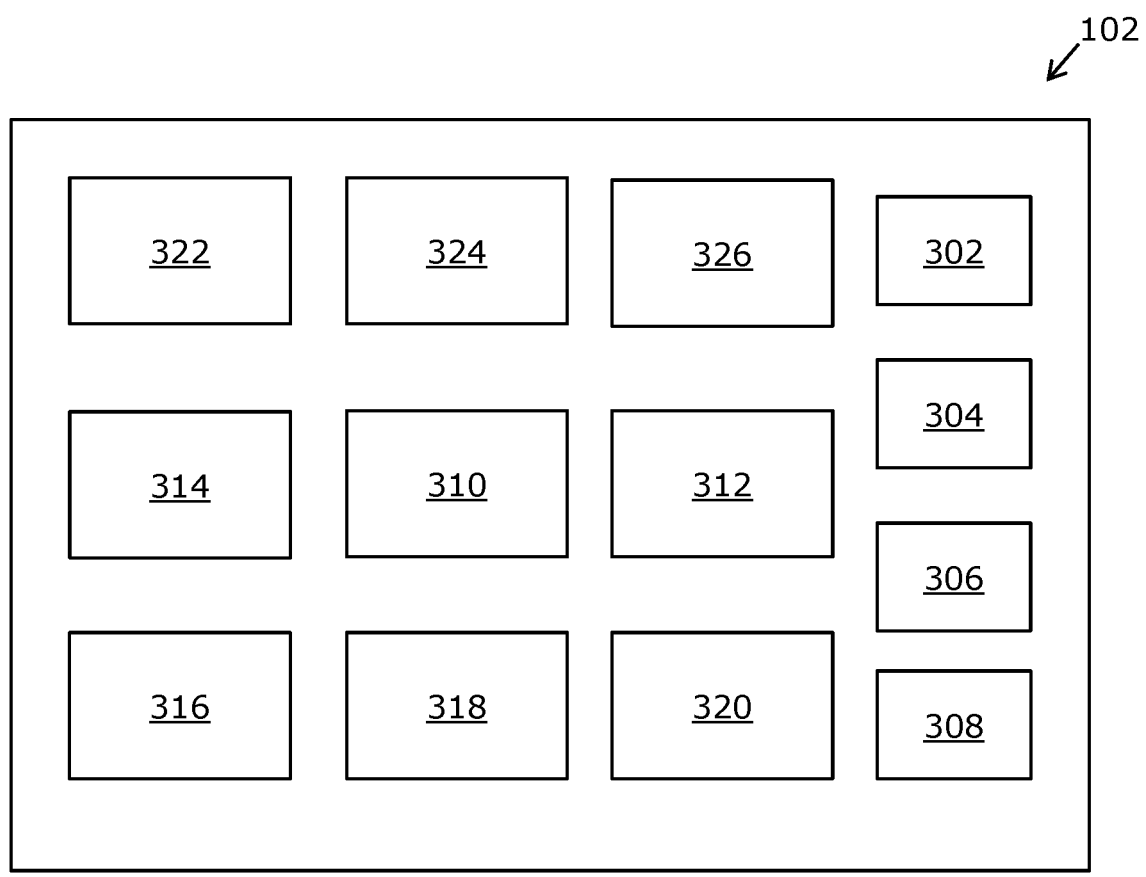

Referring to FIGS. 3A and 3B there are shown schematic illustrations of first wireless device 102, in accordance with different embodiment of the present disclosure. The first wireless device 102 comprises at least one first Radio Access Network (RAN) (depicted as RANs 302, 304, 306 and 308), a time synchronization and scheduling module 310 to receive the first timing information from the network controller, a fail over and data multiplexing module 312 to multiple the data over at least one communication link within plurality of communication links, a resource slicing module 314 to allocate the network and radio resources to create network slices, a wireless device manager module 316 to request the communication links within the plurality of communication links from the network controller, a network management module 318 to manage the network resources, a resource allocation module 320 to analyze the resources, a cellular modem 322 and a wireless modem 324.

Referring to FIG. 3B, the first wireless device 102 further comprises a socket 326, wherein the socket 326 enables the first wireless device to connect to at least one first industrial device via a wired network infrastructure.

Figure 4:
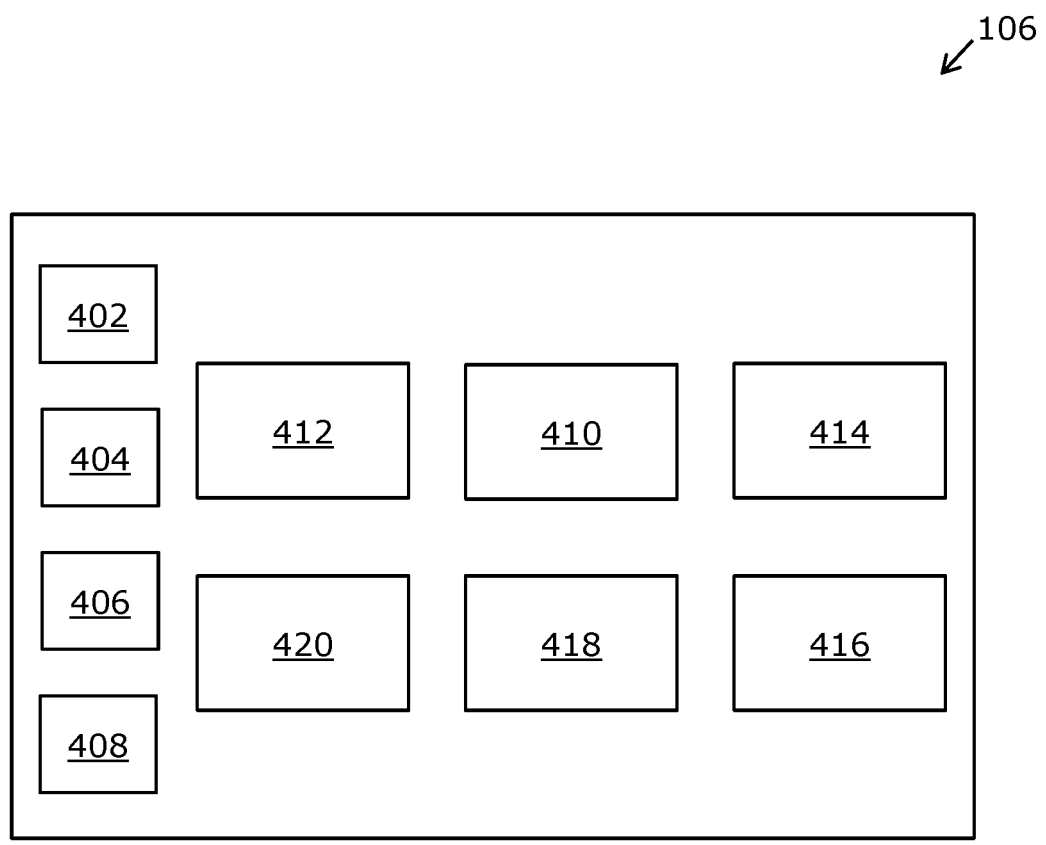
FIG. 4 is a schematic illustration of a network controller, in accordance with an embodiment of the present disclosure.

Referring to FIG. 4, there is shown a schematic illustration of a network controller 106, in accordance with an embodiment of the present disclosure. The network controller 106 comprises at least one second Radio Access Network (RAN) (depicted as RANs 402, 404, 406 and 408), a time synchronization and scheduling to controller 410 to provide the first timing information to the first sub-network and second timing information to the second sub-network, a fail over and packet duplication controller 412 to aggregate the multiplexed data and allocate communication links to the industrial network, a resource slicing controller 414 to set a policy for creating network slices, a wireless device controller 416 to receive a request from the wireless device to allocate communication links, a network management controller 418 to communicate with routers and switches in the industrial network, a resource allocation controller 420 to manage the network resources and to allocate the network slices.

Figure 5:
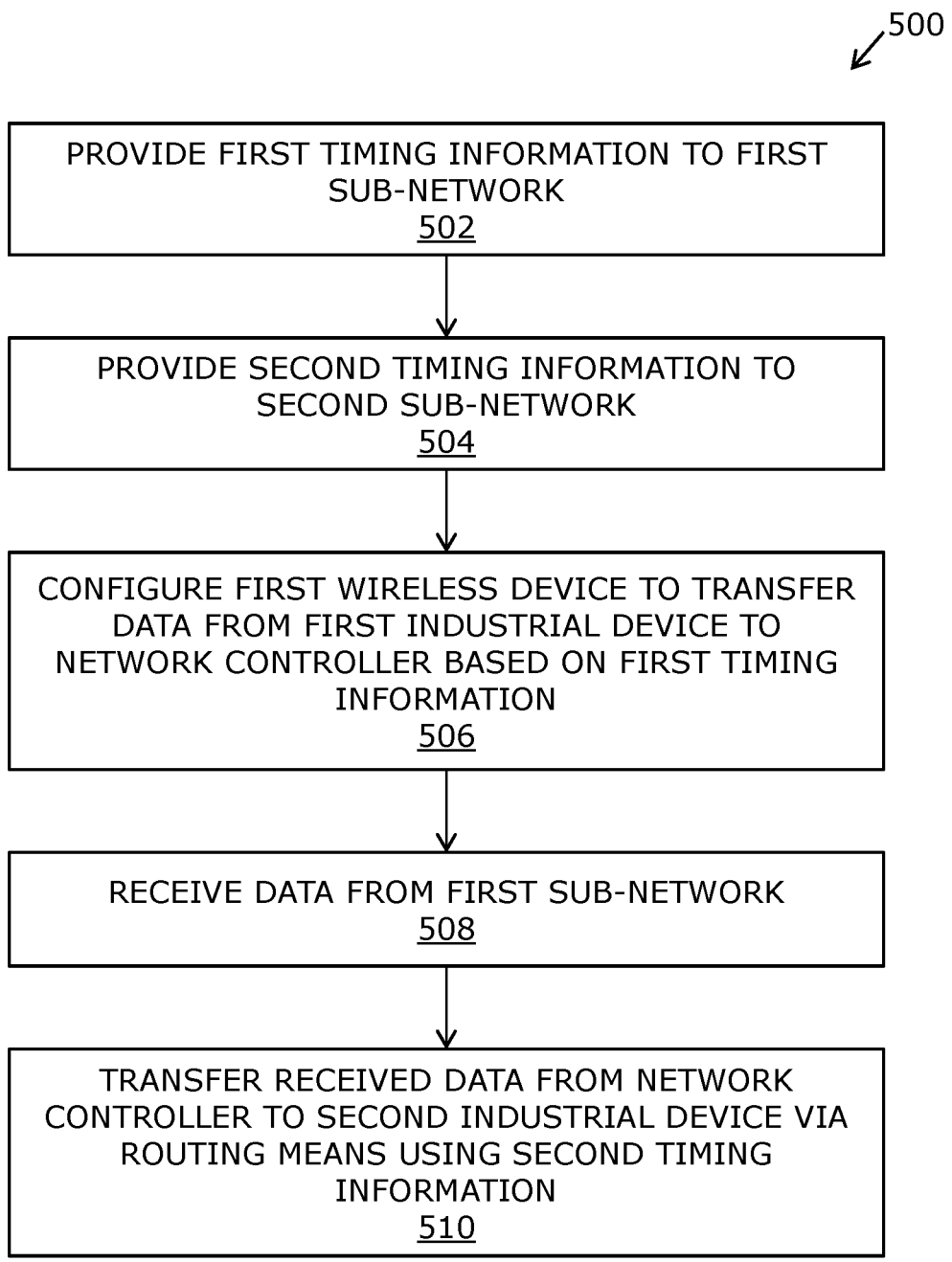
FIG. 5 is a schematic illustration of steps of a method for an isochronous data transmission in an industrial network, in accordance with an embodiment of the present disclosure.

Referring to FIG. 5, there is shown a schematic illustration of steps of a method 500 for an isochronous data transmission in an industrial network, in accordance with an embodiment of the present disclosure. The method 500 is implemented in an industrial network comprising a first sub-network comprising at least one first industrial device and a first base station, a second sub-network comprising at least one second industrial device and a first routing means, a first wireless device configured to provide a communication between the at least one first industrial device and the first base station, a network controller coupled to the first base station and to the first routing means and a reference clock.

At a step 502, a first timing information is provided to the first sub-network. At a step 504, a second timing information is provided to the second sub-network. At a step 506, the first wireless device is configured to transfer a data from the at least one first industrial device to the network controller, based on the first timing information. At a step 508, the data from the first sub-network is received by the network controller. At a step 510, the received data is transferred from the network controller to the at least one second industrial device of the second sub-network via routing means using the second timing information.

The steps 502, 504, 506, 508, and 510 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for an isochronous data transmission in an industrial network wherein the industrial network comprises:
   a first sub-network comprising at least one first industrial device and a first base station,
   a second sub-network comprising at least one second industrial device and a first routing means,
   a first wireless device configured to provide a communication between the at least one first industrial device and the first base station,
   a network controller coupled to the first base station and to the first routing means, and
   a reference clock,
   the method comprising steps of:
   providing a first timing information to the first sub-network;
   providing a second timing information to the second sub-network;
   configuring the first wireless device to transfer a data from the at least one first industrial device to the network controller based on the first timing information;
   receiving, by the network controller, the data from the first sub-network; and
   transferring the received data from the network controller to the at least one second industrial device of the second sub-network via the first routing means using the second timing information.

2. The method according to claim 1, wherein providing the first timing information and the second timing information comprises synchronizing an internal clock of the first wireless device, an internal clock of the at least one first industrial device and an internal clock of the at least one second industrial device with the reference clock.

3. The method according to claim 2, wherein the first timing information associated with the at least one first industrial device and the second timing information associated with the at least one second industrial device comprises at least one of: an uplink time slot, a downlink time slot, for each of the at least one first industrial device and the at least one second industrial device, respectively.

4. The method of claim 1, wherein configuring the first wireless device comprises:
   activating a plurality of communication links to establish communication interface for the at least one first industrial device and the at least one second industrial device, using the first wireless device, for isochronous data transmission in the industrial network;
   slicing activated communication links from the plurality of communication links, based on an aggregated capacity for isochronous data transmission in the industrial network, to create the network slices; and
   designating sliced communication links, for transmission of the data based on a priority index associated with the data.

5. The method according to claim 1, wherein transferring the received data comprises configuring the routing means to transfer the data from the network controller to the at least one second industrial device based on the second timing information.

6. The method of claim 1, wherein the method further comprises employing a machine learning algorithm to implement operations associated with at least one of the: network controller, first wireless device.

7. A system for an isochronous data transmission in an industrial network, wherein the industrial network comprises:
   a first sub-network comprising at least one first industrial device and a first base station,
   a second sub-network comprising at least one second industrial device and a first routing means,
   a first wireless device configured to provide a communication between the first industrial device and the first base station,
   a network controller coupled to the first base station and to the first routing means, and
   a reference clock,
   wherein the network controller is configured to:
   provide a first timing information to the first sub-network;
   provide a second timing information to the second sub-network;
   configure the first wireless device to send a data from the at least one first industrial device to the network controller based on the first timing information;
   receive the data from the first sub-network; and
   send the received data from the network controller to the at least one second industrial device of the second sub-network via the first routing means using the second timing information.

8. The system according to claim 7, wherein the network controller is further configured to configure the routing means to send data from the at least one second industrial device to the network controller based on the second timing information.

9. The system according to claim 7, wherein the first wireless device comprises at least one first Radio Access Network, a time synchronization and scheduling module to receive the first timing information from the network controller, a fail over and data multiplexing module to multiplex the data over at least one communication link within a plurality of communication links, a resource slicing module to allocate the network resources and radio resources to create network slices, a wireless device manager module to request the communication links within the plurality of communication links from the network controller, a network management module to manage the network resources, a resource allocation module to analyse the resources, and at least one of: a cellular modem, a wireless modem and at least one socket.

10. The system according to claim 7, wherein the network controller comprises at least one second Radio Access Network, a time synchronization and scheduling controller to provide the first timing information to the first sub-network and second timing information to the second sub-network, a fail over and packet duplication controller to aggregate multiplexed data and allocate communication links to the industrial network, a resource slicing controller to set a policy for creating network slices, a wireless device controller to receive a request from the first wireless device to allocate communication links, a network management controller to communicate with routers and switches in the industrial network, a resource allocation controller to manage network resources and to allocate the network slices.

11. The system according to claim 7, wherein the first wireless device is configured to:
 receive from the network controller the first timing information and time slots, and schedule the received time slots for the first industrial device;
 multiplex received data; and
 activate a plurality of communication links to establish wireless communication interface for the at least one first industrial device and the at least one second industrial device, for isochronous data transmission in the industrial network.

12. The system according to claim 7, wherein a machine learning algorithm is employed to implement operations associated with at least one of the: network controller, first wireless device.

* * * * *